US010703680B2

(12) United States Patent
Meschke et al.

(10) Patent No.: US 10,703,680 B2
(45) Date of Patent: Jul. 7, 2020

(54) FIBER-REINFORCED CERAMIC MATRIX COMPOSITE FOR ELECTRONIC DEVICES

(71) Applicant: Apple Inc., Cupertino, CA (US)

(72) Inventors: Andrew J. Meschke, Cupertino, CA (US); Naoto Matsuyuki, Tokyo-to (JP)

(73) Assignee: APPLE INC., Cupertino, CA (US)

( * ) Notice: Subject to any disclaimer, the term of this patent is extended or adjusted under 35 U.S.C. 154(b) by 364 days.

(21) Appl. No.: 15/146,545

(22) Filed: May 4, 2016

(65) Prior Publication Data
US 2016/0347674 A1 Dec. 1, 2016

Related U.S. Application Data

(60) Provisional application No. 62/166,078, filed on May 25, 2015.

(51) Int. Cl.
*C04B 35/80* (2006.01)
*C04B 35/638* (2006.01)
(Continued)

(52) U.S. Cl.
CPC .............. *C04B 35/806* (2013.01); *B28B 1/24* (2013.01); *B28B 1/52* (2013.01); *B28B 7/0008* (2013.01); *C04B 35/08* (2013.01); *C04B 35/10* (2013.01); *C04B 35/48* (2013.01); *C04B 35/50* (2013.01); *C04B 35/56* (2013.01); *C04B 35/58* (2013.01); *C04B 35/5805* (2013.01); *C04B 35/58085* (2013.01); *C04B 35/638* (2013.01); *C04B 35/803* (2013.01); *C04B 2235/3229* (2013.01); *C04B 2235/526* (2013.01); *C04B 2235/5236* (2013.01); *C04B 2235/5248* (2013.01);
(Continued)

(58) Field of Classification Search
CPC .......................................... Y10T 428/249928
See application file for complete search history.

(56) References Cited

U.S. PATENT DOCUMENTS

| | | |
|---|---|---|
| 4,764,491 A | 8/1988 | Quadir |
| 4,833,001 A | 5/1989 | Kijima et al. |
| | (Continued) | |

FOREIGN PATENT DOCUMENTS

| | | |
|---|---|---|
| CN | 105622096 | 6/2016 |
| EP | 0826645 | 3/1998 |
| | (Continued) | |

OTHER PUBLICATIONS

U.S. Appl. No. 15/614,747, filed Jun. 6, 2017, Matsuyuki et al.
(Continued)

*Primary Examiner* — Jennifer A Steele
(74) *Attorney, Agent, or Firm* — Dorsey & Whitney LLP

(57) ABSTRACT

A method of forming a ceramic component is disclosed. A ceramic matrix material is combined with a binder material. The ceramic matrix material and the binder material are mixed to create an intermediate slurry. After mixing the ceramic matrix material and the binder material, reinforcing fibers are added to the intermediate slurry to create a final slurry. The final slurry is introduced into a mold cavity having a shape corresponding to the ceramic component. The final slurry is at least partially cured within the mold cavity to form an intermediate casting. The intermediate casting is sintered to produce the ceramic component from the intermediate casting.

16 Claims, 8 Drawing Sheets

(51) Int. Cl.
- *C04B 35/58* (2006.01)
- *C04B 35/08* (2006.01)
- *C04B 35/56* (2006.01)
- *C04B 35/50* (2006.01)
- *C04B 35/48* (2006.01)
- *C04B 35/10* (2006.01)
- *B28B 7/00* (2006.01)
- *B28B 1/24* (2006.01)
- *B28B 1/52* (2006.01)

(52) U.S. Cl.
CPC .. *C04B 2235/5268* (2013.01); *C04B 2235/60* (2013.01); *C04B 2235/602* (2013.01); *C04B 2235/6027* (2013.01); *Y10T 428/249928* (2015.04)

(56) References Cited

U.S. PATENT DOCUMENTS

| | | | |
|---|---|---|---|
| 4,857,093 A | 8/1989 | Prewo et al. | |
| 5,589,115 A * | 12/1996 | Sherwood | B32B 18/00 156/89.26 |
| 6,133,181 A | 10/2000 | Wentworth et al. | |
| 6,217,997 B1 * | 4/2001 | Suyama | C04B 35/565 428/293.4 |
| 6,361,888 B1 * | 3/2002 | Kriven | B32B 18/00 428/293.4 |
| 8,076,011 B2 | 12/2011 | Chiang et al. | |
| 8,251,210 B2 | 8/2012 | Schmidt et al. | |
| 8,298,975 B2 | 10/2012 | Hasegawa et al. | |
| 8,322,560 B2 | 12/2012 | Jiang et al. | |
| 8,394,167 B2 | 3/2013 | Merkel et al. | |
| 8,442,604 B1 | 5/2013 | Diebel | |
| 8,563,644 B2 | 10/2013 | Imada et al. | |
| 8,781,109 B2 | 7/2014 | Hong | |
| 9,007,747 B2 | 4/2015 | Gandhi | |
| 9,011,997 B2 | 4/2015 | Weber | |
| 9,448,713 B2 | 9/2016 | Cruz-Hernandez et al. | |
| 9,516,150 B2 | 12/2016 | Jeon et al. | |
| 2003/0026984 A1 * | 2/2003 | Nagayama | B29C 45/0005 428/367 |
| 2005/0008841 A1 * | 1/2005 | Schofalvi | C04B 35/195 428/292.1 |
| 2007/0207186 A1 * | 9/2007 | Scanlon | A61F 2/07 424/424 |
| 2009/0197048 A1 | 8/2009 | Amin et al. | |
| 2010/0003479 A1 | 1/2010 | Hwang et al. | |
| 2011/0124253 A1 * | 5/2011 | Shah | B82Y 30/00 442/60 |
| 2012/0000810 A1 * | 1/2012 | Dry | B29C 73/22 206/524.1 |
| 2012/0049702 A1 * | 3/2012 | DiFonzo | B29C 53/562 312/223.2 |
| 2012/0268412 A1 | 10/2012 | Cruz-Hernandez et al. | |
| 2013/0108813 A1 | 5/2013 | Zhu | |
| 2013/0224454 A1 | 8/2013 | Jung et al. | |
| 2013/0316116 A1 | 11/2013 | Adams et al. | |
| 2014/0178642 A1 | 6/2014 | Milanovska et al. | |
| 2014/0294571 A1 * | 10/2014 | Hillier | F01D 9/04 415/173.4 |
| 2015/0010721 A1 | 1/2015 | Tanida et al. | |
| 2015/0246459 A1 | 9/2015 | Dorn et al. | |
| 2016/0047254 A1 * | 2/2016 | Bruck | C23C 26/02 428/307.3 |
| 2016/0089811 A1 | 3/2016 | Matsuyuki et al. | |
| 2016/0090326 A1 | 3/2016 | Matsuyuki et al. | |
| 2016/0255929 A1 | 9/2016 | Nazzaro et al. | |
| 2017/0075039 A1 | 3/2017 | Hart et al. | |
| 2017/0088473 A1 | 3/2017 | Wilson et al. | |
| 2017/0300114 A1 | 10/2017 | Matsuyuki et al. | |
| 2017/0361067 A1 | 12/2017 | Nazzaro et al. | |

FOREIGN PATENT DOCUMENTS

| | | |
|---|---|---|
| EP | 1857428 | 11/2007 |
| EP | 2243756 | 10/2010 |
| EP | 2266934 | 12/2010 |
| JP | 07191156 A * | 7/1995 |
| WO | WO 16/043378 | 3/2016 |

OTHER PUBLICATIONS

Siqueira et al., "Poly(borosiloxanes) as Precursors for Carbon Fiber Ceramic Matrix Composites," http://www.scielo.br/scielo.php?script=sci_arttext&pid=S1516-14392007000200009, Materials Research, vol. 10, No. 2, São Carlos, Apr./Jun. 2007.

U.S. Appl. No. 15/098,836, filed Apr. 14, 2016, Matsuyuki et al.

U.S. Appl. No. 15/371,121, filed Dec. 6, 2016, Ely et al.

U.S. Appl. No. 15/611,329, filed Jun. 1, 2017, Ely et al.

* cited by examiner

FIBER-REINFORCED CERAMIC MATRIX COMPOSITE FOR ELECTRONIC DEVICES

CROSS-REFERENCE TO RELATED APPLICATION

This application is a nonprovisional patent application of and claims the benefit of U.S. Provisional Patent Application No. 62/166,078, filed May 25, 2015 and titled "Fiber-Reinforced Ceramic Matrix Composite for Electronic Devices," the disclosure of which is hereby incorporated herein by reference in its entirety.

FIELD

This disclosure relates generally to ceramic materials, and more particularly to fiber-reinforced ceramic matrix composites for electronic device housings, and methods, procedures, and techniques related thereto.

BACKGROUND

Electronic devices often include housings that enclose some or all of the sensitive components of the electronic device. Traditionally, plastic has been used for electronic device housings, at least in part because it is inexpensive and easy to form into the shapes and geometries required for modern electronic devices. Increasingly, however, housings for electronic devices are being made from materials other than plastic. For example, housings that include glass, ceramics, and the like are being used for their superior hardness, optical properties, and aesthetic properties.

SUMMARY

Embodiments discussed herein are related to fiber-reinforced ceramic matrix composite materials, as well as methods of preparing fiber-reinforced ceramic matrix materials and methods of manufacturing components from fiber-reinforced ceramic matrix composite materials.

In some embodiments, a method of forming a ceramic component comprises introducing a slurry into a mold cavity having a shape corresponding to the ceramic component, wherein the slurry comprises a ceramic matrix material, a binder material, and reinforcing fibers. The slurry is at least partially cured within the mold cavity to form an intermediate casting. The intermediate casting is sintered to produce the ceramic component.

In some embodiments, a method of forming a ceramic component includes forming an intermediate slurry. Forming the intermediate slurry comprises combining a ceramic matrix material and a binder material, and mixing the ceramic matrix material and the binder material using an agitator that is at least partially submerged in the mixture of the ceramic matrix material and the binder material. The method also includes forming a final slurry. The final slurry is formed by adding reinforcing fibers to the intermediate slurry, and centrifugally mixing the reinforcing fibers with the intermediate slurry using a centrifugal mixer. The method also includes introducing the final slurry into a mold cavity to produce a casting corresponding to the ceramic component.

In some embodiments, a method of forming a ceramic component includes forming a slurry by combining a ceramic matrix material and a binder material, and substantially evenly distributing reinforcing fibers throughout the slurry. The slurry is introduced into a mold cavity having a shape corresponding to the ceramic component, and the reinforcing fibers aligned substantially unidirectionally within the mold cavity. The slurry is at least partially cured within the mold cavity to form an intermediate casting, and the intermediate casting is sintered to produce the ceramic component.

In some embodiments, a ceramic housing component for an electronic device comprises a ceramic matrix material, and reinforcing fibers distributed substantially evenly throughout the ceramic matrix material and oriented substantially unidirectionally within the ceramic housing component. The housing component is formed from a slurry comprising the ceramic matrix material and the reinforcing fibers.

DETAILED DESCRIPTION

Figure 1A:
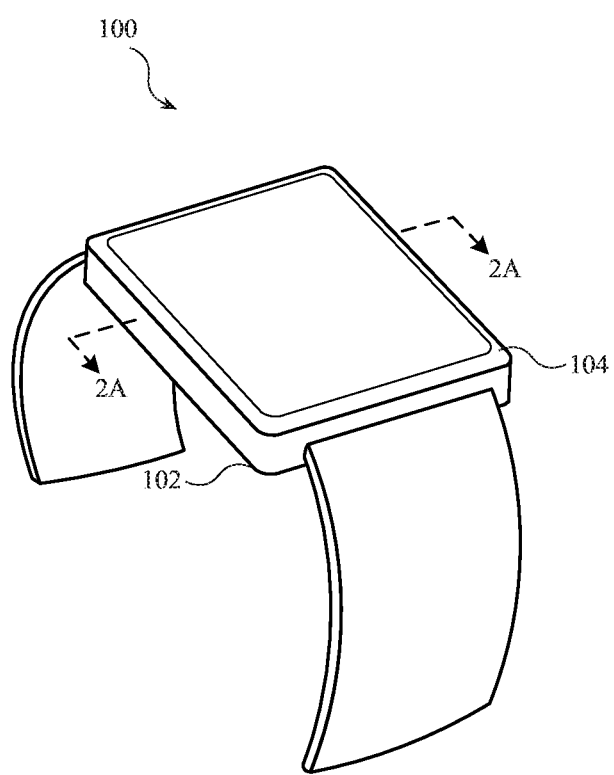
FIG. 1A depicts an illustrative isometric view of an example of an electronic device.

Described herein is a method for producing fiber-reinforced ceramic components, as well as methods of preparing ceramic materials that include reinforcing fibers and from which fiber-reinforced ceramic components are formed. Also described are particular examples of components that include reinforcing fibers within a ceramic matrix material. Fiber-reinforced ceramic components may be stronger, tougher, and more easily formed as compared to other materials, such as plastic, metal, non-fiber-reinforced ceramic, and so on. For example, the tensile strength of a fiber-reinforced ceramic component in a direction that is parallel to the reinforcing fibers may be higher than an otherwise identical component formed from a ceramic material without reinforcing fibers.

Many different components for many different purposes may be manufactured from fiber-reinforced ceramic components. As one example, housings for electronic devices may be formed entirely or partially from fiber-reinforced ceramic components. The strength and toughness of the fiber-reinforced ceramic material may result in housings that are more resistant to breakage or damage when dropped or mishandled than housings formed from other materials may be. Other non-limiting examples of components that may be formed from fiber-reinforced ceramic include structural components for consumer or industrial devices, bearings, machine tools, machine parts, rocket components (or other aerospace applications), and brake disks (automotive or otherwise).

In order to form a fiber-reinforced ceramic material, at least a ceramic matrix material, a binder material, and reinforcing fibers may be mixed together to create a slurry. As described herein, the mixing process may include mixing the reinforcing fibers with the other components without using agitators or other mixing devices that are submerged in the mixture, as such devices could damage or break reinforcing fibers. For example, while an intermediate slurry including some of the components may first be mixed using a ball or propeller in contact with the materials, a subsequent non-contact mixing process, such as centrifugal mixing, may be used to distribute the reinforcing fibers throughout the intermediate slurry.

The mixed slurry that includes the reinforcing fibers may then be introduced into a mold cavity having a shape corresponding to the particular component to be produced. The mold and the process by which the slurry is introduced into the mold cavity may also reduce or minimize damage to the reinforcing fibers, and may result in a desired orientation of the fibers within the final component. For example, the gate of the mold (through which the ceramic slurry passes when entering the mold cavity) may have a particular size relative to the reinforcing fibers in the slurry, so that the reinforcing fibers can pass freely into the mold cavity and so that the fibers align with the direction of the flow of the slurry through the mold cavity.

Additionally, a sintering process, which may occur after the creation of an intermediate casting by molding the slurry in the mold cavity, may be optimized to prevent asymmetrical distortions of the component during heating. In particular, while a ceramic material that lacks reinforcing fibers may shrink evenly and predictably during the sintering process, the presence of the reinforcing fibers in the intermediate casting may cause the component to curl or otherwise deform in a non-uniform or asymmetric manner, such that the dimensional integrity of the component is lost. Accordingly, when sintering an intermediate casting that includes reinforcing fibers, the intermediate casting may be elevated from a surface of a sintering furnace. In this way, the component will be more evenly heated (and possibly cooled) during sintering, resulting in less deformation and greater dimensional stability.

The foregoing process may produce a component (e.g., a housing component) having a sintered ceramic matrix reinforced with evenly distributed reinforcing fibers. This component may be tougher than a similar component made from unreinforced ceramic material, and thus may be better suited to certain applications. Moreover, because the ceramic matrix material and the reinforcing fibers are mixed prior to creating any casting or molded part, the component can be manufactured more quickly and efficiently than may be possible with other techniques for making fiber-reinforced ceramic components.

Various additional benefits, structures, differences, and/or features of the fiber-reinforced ceramic matrix composite described herein will be apparent from the attached figures and corresponding description. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

FIG. 1A is an illustrative isometric view of an electronic device 100, which is a watch in this embodiment. However, this is merely one example of an electronic device, and the device 100 may be any appropriate electronic device, including a smartphone, a laptop computer, a wearable electronic device, a health monitoring device, a biometric sensor, a calculator, an audio/video player or recorder, and so on.

The device 100 includes a housing 102. The housing 102 may form an outer surface or partial outer surface of the device 100 that protects and encloses the internal components of the device 100. In some embodiments, the housing 102 is a protective case that is configured to enclose or partially enclose a device 100 that already has a housing. The housing 102 may be any appropriate shape. For example, the housing 102 may include an interior surface surrounded by flanges, where the interior surface and flanges define a cavity that receives components of the electronic device.

Additionally, the housing 102 may include one or more apertures therethrough (not shown) that allow interior components of the electronic device 100 to communicate to the outside environment. For example, the housing 102 may include an aperture adjacent to a sensor (e.g., an imaging sensor, a biometric sensor, or the like), an emitter (e.g., a flash for a camera, an electromagnetic radiation emitter for biometric sensing purposes), an antenna, or any other appropriate component. The aperture may include a cover glass, lens, or other component therein in order to allow a sensor or other component to communicate with the outside environment. An aperture may receive a button, switch, or other input component therethrough.

The housing 102 may be coupled to a cover glass 104 that covers an open portion of the housing 102 and further encloses the components of the electronic device 100. In some embodiments, the cover glass 104 covers and protects a display screen of the device 100. In some embodiments, the cover glass 104 also provides an external surface for a touch-sensitive display.

Figure 1B:
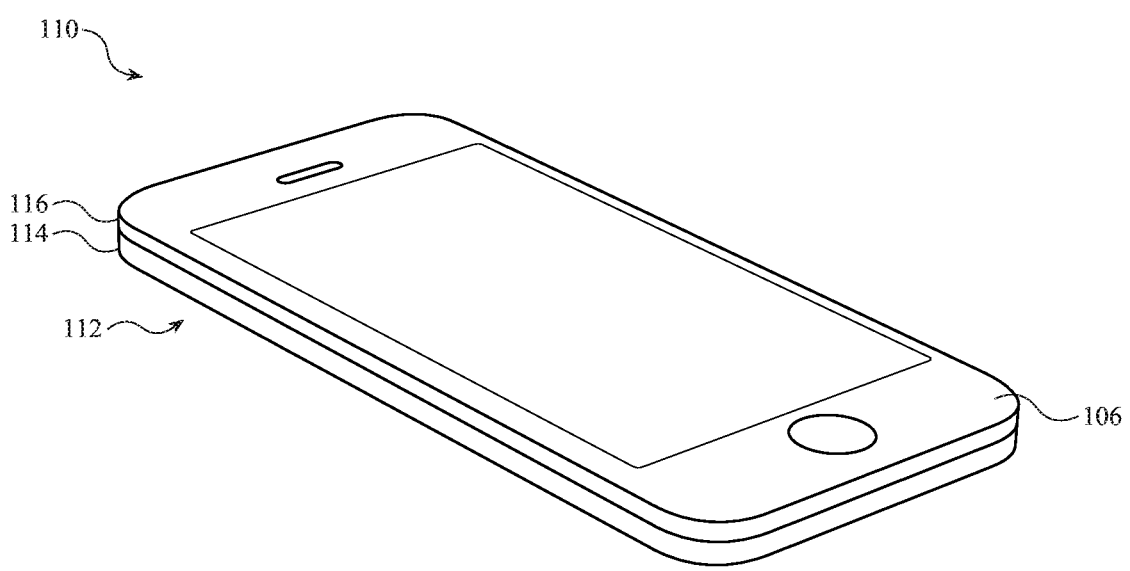
FIG. 1B depicts an illustrative isometric view of another example of an electronic device.

FIG. 1B is an isometric view of another electronic device 110, which is a smartphone in this embodiment. Similar to the device 100, the device 110 includes a housing 112 that forms an outer surface or partial outer surface of the device 110. The housing 112 may include a first housing portion 114 and a second housing portion 116. In some embodiments, the first housing portion 114 forms a bottom portion of the housing, and the second housing portion 116 forms a top portion of the housing. The first and second housing portions 114, 116 may be coupled together to form the housing 112. Additionally, either housing portion 112, 114 may include one or more apertures therethrough (not shown) that allow interior components of the electronic device 110 to communicate to the outside environment. Moreover, a cover glass 106 may be coupled to the second portion of the housing 116.

While FIG. 1A depicts a housing formed from a single component (e.g., housing 102), and FIG. 1B depicts a housing formed from two components (e.g., the housing 112 includes a top portion 116 and a bottom portion 114), these are merely two example of possible housing configurations. A housing in accordance with the present disclosure may include more or fewer housing components, and may include different configurations and/or shapes of housing components.

Components for electronic devices, such as the housings 102 and 112 (or portions thereof), are increasingly made with materials other than plastic. For example, the housings 102, 112 may include portions that are made from ceramic, crystal, glass, metals, and the like. As a specific example, for the device 100, the cover glass 104 (FIG. 1A) may be formed from a glass or crystalline material, and the housing 102, covering the back and sides of the device, may be formed from a ceramic material. Similarly, the cover glass 106 (FIG. 1B) may be formed from a glass or crystalline material, and one or both of the first and second housing portions 114, 116 may be formed from a ceramic material.

Ceramic materials have numerous qualities that make them particularly useful for use in electronic device housings. For example, they may be highly scratch resistant, making them particularly well suited for electronic devices that are frequently subject to bumps, scrapes, and scratches, such as wearable electronic devices (e.g., smartwatches). Ceramic materials may also be relatively light, making handheld or wearable electronic devices easier to carry, wear, and use. Moreover, ceramic materials may be able to achieve a high degree of surface polish.

Adding reinforcing fibers to the ceramic material may improve or enhance certain properties of ceramic materials. For example, adding reinforcing fibers to a ceramic material may increase the tensile strength, flexural strength, elasticity, and/or toughness of the ceramic material. In some embodiments, the extent to which such properties are improved or enhanced depends in part on the orientation of the force applied to the material, and whether the force is aligned with (e.g., parallel to) the direction of the reinforcing fibers. For example, in a component (or a portion of a component) where the reinforcing fibers are substantially aligned with one another, tensile strength may be increased in a direction parallel to the reinforcing fibers. Accordingly, in some embodiments, housings for electronic devices (such as the housings 102 and 112) are formed from fiber-reinforced ceramic matrix composite in order to take advantage of the properties of such materials.

Figure 2A:
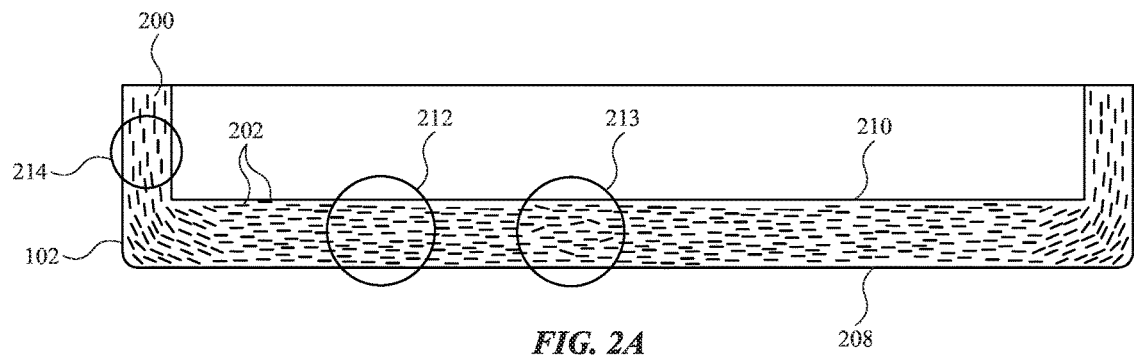
FIGS. 2A-2D depict cross-sectional views of a portion of the housing of FIG. 1A.

FIG. 2A is a cross-sectional view of the housing 102 taken along line 2A-2A in FIG. 1A, illustrating the composition of the material of the housing 102. For simplicity, some components of the device 100 that may be housed within the housing 102 are omitted in FIGS. 2A-2D. However, it will be understood that the device 100 may include components such as circuit boards, speakers, microphones, antennas, cameras, biometric or other sensors, processors, button structures/dome switches, batteries, and the like.

A first surface 208 of the housing 102 is an exterior surface of the device 100, and a second surface 210 that is opposite to the first surface is an interior surface of the device 100. In some embodiments, the housing 102 is a shell, and the second surface 210 forms one wall of an interior volume that receives components of the device 100.

The housing 102 is formed from a ceramic matrix 200 embedded with reinforcing fibers 202. In some embodiments, the reinforcing fibers 202 are aligned substantially unidirectionally throughout the housing 102. For example, when a slurry of ceramic matrix material and reinforcing fibers is introduced into a mold cavity, the reinforcing fibers 202 may become aligned with the direction of flow of the slurry. This alignment of the reinforcing fibers results in substantially unidirectional reinforcing fibers throughout the component. This does not necessarily mean that all of the fibers are parallel to all other fibers throughout the component. Rather, the "unidirectionality" described herein refers to fibers in a given volume of the component being oriented in substantially the same direction as one another, even where other fibers elsewhere in the part are not oriented in the same direction as those in the given volume. Thus, for example, in FIG. 2A, the fibers in area 212 are all oriented in substantially the same direction as one another, and the fibers in area 214 are all oriented in substantially the same direction as one another, but the fibers in area 212 are perpendicular to the fibers in area 214. Even though fibers in different areas of the part do not necessarily trend in the same direction, the fibers in the housing 102 may still be described as unidirectional. (Components where all of the fibers are parallel to one another throughout the component are also considered to have unidirectional reinforcing fibers.)

Moreover, not every fiber in a given area needs to be exactly parallel with other fibers in that area in order for the fibers in that area (or the component as a whole) to be considered unidirectional. Rather, fibers may be considered unidirectional so long as the fibers in a given area, in aggregate, trend toward a particular direction. For example, in FIG. 2A, the fibers in area 213 are not all parallel to one another. Nevertheless, the overall trend of the reinforcing fibers in area 213 is toward a common direction, and thus the fibers in area 213 may be considered unidirectional.

In some parts, fibers are unidirectional in only a portion of the component, and in other portions, the fibers are not unidirectional. For example, the strength afforded by reinforcing fibers may be desirable in one area of a component, and not necessary in other areas. Thus, process parameters (e.g., mold shape, fiber size, slurry viscosity, and so on) may be selected such that the fibers are unidirectional in a selected area and are not unidirectional in another area (or without regard to whether or not the process parameters will result in unidirectionality in other areas).

Figure 2B:
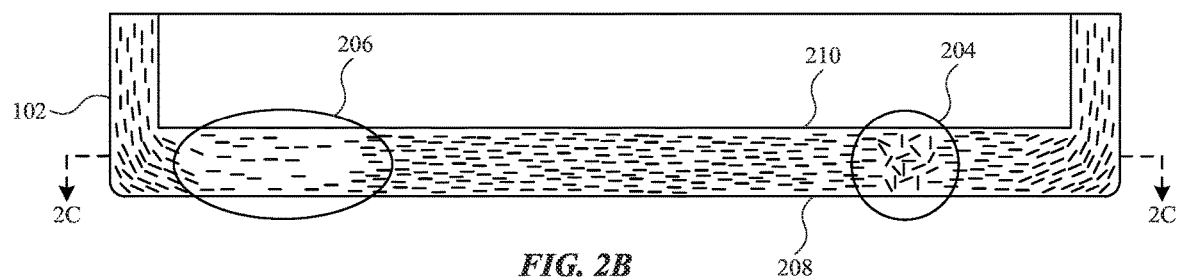

Achieving unidirectionality of the reinforcing fibers throughout the component may be useful for achieving the benefits that the fibers impart to the component. Specifically, the component may be stronger and/or tougher if the reinforcing fibers are substantially parallel to one another. Thus, an area within the component where the fibers are not unidirectional may be weaker than other areas. FIG. 2B is an alternative cross-sectional view of the housing 102 taken along line 2A-2A in FIG. 1A, including an area 204 where the fibers are not unidirectional. This area may be weaker than the surrounding areas due to the discontinuity in the fiber orientations. Accordingly, the method described herein may reduce the occurrence of areas where the reinforcing fibers are not unidirectional, such as the area 204.

In addition to being oriented substantially unidirectionally, the reinforcing fibers may be substantially evenly distributed throughout the housing 102. FIG. 2A illustrates an example of a housing 102 in which the reinforcing fibers are substantially evenly distributed throughout. FIG. 2B, on the other hand, illustrates an example of a housing 102 including an area 206 where the fibers are not uniformly distributed. In areas where fibers are not or are only sparsely present, such as area 206, the component may be weaker than it is in the surrounding areas, and possibly weaker than is suitable for that particular component.

Uniformly mixing the fibers throughout the slurry prior to molding the housing 102, as well as maintaining low shear forces within the slurry when introducing the slurry into the mold cavity, may ensure even distribution of the reinforcing fibers throughout the component. In particular, shear forces in the slurry may cause the fibers within the slurry to redistribute unevenly, and may also disrupt the unidirectionality of the fibers. One way to ensure or facilitate low shear forces within the slurry is to gravity cast the slurry without applying additional external pressure to force the slurry into the mold cavity. Because the slurry is not pressurized, the slurry may experience lower shear forces during the molding process, resulting in even distribution and unidirectionality of the fibers within the ceramic matrix.

Figure 2C:
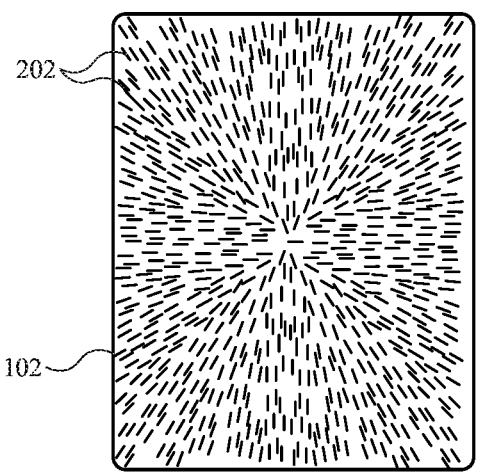

In some embodiments, the mold geometry and/or the location of a gate through which the slurry is passed into the mold cavity causes the fibers to align in a particular orientation with respect to the component. In particular, the location of a gate defines the direction of flow of the slurry through the mold cavity. For example, the slurry may flow generally radially outward from the gate into the mold cavity, resulting in a substantially radial alignment of the fibers within the component in the area surrounding the gate. FIG. 2C is a cross-sectional view of one example of the housing 102 taken along line 2C-2C in FIG. 2B. FIG. 2C illustrates a substantial radial alignment of the fibers 202 within the housing 102, where the gate is located in the center of the housing 102.

Figure 2D:
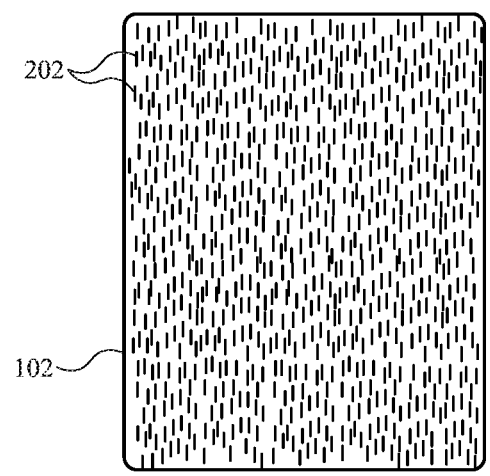

In some embodiments, it may be desirable to align all of the fibers along a particular axis or direction of the housing 102. For example, a maximum strength may be desired along a particular axis of a particular portion the housing 102. Accordingly, a gate may be located in the mold such that the initial radial flow profile that will surround the gate is set apart from the area where the substantially parallel fiber alignment is desired. FIG. 2D is an alternative cross-sectional view of the housing 102 taken along line 2C-2C in FIG. 2B, where the fibers are substantially parallel to the long axis of the housing 102. While FIG. 2D shows one example fiber direction, the mold and gate may be configured to align the fibers along any desired axis or direction of the housing 102.

In some embodiments, it is desirable that the reinforcing fibers within a component are not unidirectional. For example, reinforcing fibers may be aligned substantially randomly throughout a component. Randomly oriented fibers may result in a component that has the same or similar material properties in all directions (e.g., the strength increase provided by the reinforcing fibers is uniform in all directions). Also, a component may be formed such that the reinforcing fibers in one portion of the component are oriented differently than fibers in another portion of the component. For example, reinforcing fibers in one area of a component may be substantially unidirectional, whereas in another area, the reinforcing fibers are randomly oriented.

Such non-homogenous fiber orientations may be achieved in any appropriate way. For example, a mold may include multiple gates, and a slurry (including reinforcing fibers) may be introduced into the gates such that the reinforcing fibers entering through one gate are substantially unidirectional, whereas fibers entering through the other gate are substantially randomly oriented. This may be achieved by varying processing and/or material parameters between the gates, including pressure, viscosity, fiber size and/or shape, fiber material, or the like, or by varying the geometry and/or size of the gates themselves.

As another example, non-homogenous fiber orientations may be achieved by a multi-stage mold filling process. In particular, a slurry (with reinforcing fibers) may be introduced into the mold cavity using first processing and/or material parameters, such that the mold cavity is partially filled and the reinforcing fibers are substantially unidirectional within the mold cavity. The introduction of the slurry is then ceased, and another slurry introduction process begins using different processing and/or material parameters, filling a next portion of the mold cavity (or all of the mold cavity) such that the reinforcing fibers in the next portion of the mold cavity are substantially randomly oriented (or unidirectional in a different direction than the first slurry introduction process). For example, a first slurry introduction process may occur at a first pressure configured to cause substantial alignment of the reinforcing fibers, and a second slurry introduction process may occur at a different pressure (e.g., a higher pressure than the first) to cause substantial random alignment of the reinforcing fibers.

As yet another example, non-homogenous fiber orientations may be achieved by separately forming multiple intermediate castings each having a desired fiber orientation, coupling the portions together prior to sintering, and then sintering the intermediate castings together. For example, a first intermediate casting is formed that has a first fiber orientation. A second intermediate casting is formed that has a second fiber orientation. The intermediate castings are then assembled and sintered to fuse the intermediate castings and form the final component. In some embodiments, additional slurry (with or without reinforcing fibers) is included between the intermediate castings to aid in the fusing of the intermediate castings during sintering.

The fiber orientations of the first and second intermediate castings may be any desired orientations. For example, the fiber orientation of the first intermediate casting may be substantially unidirectional, and the fiber orientation of the second intermediate casting may be substantially random. Alternatively, the fiber orientations of both the first and second intermediate castings may be substantially unidirectional, and the intermediate castings are assembled such that the first and second fiber orientations are not parallel. (Additional intermediate castings with different fiber orientations may also be included.)

In embodiments where non-homogenous fiber orientations are used, the reinforcing fibers used in the different portions of the component may also be different. For example, a portion with a unidirectional fiber orientation may contain zirconia fibers, whereas a portion with randomly oriented fibers may contain alumina. As another example, a portion with a unidirectional fiber orientation may contain zirconia fibers of a first size (length and/or diameter), whereas a portion with randomly oriented fibers may contain zirconia fibers of a second size. Of course, other combinations of fibers, fiber sizes and/or shapes, fiber properties, and/or fiber materials are also possible.

Figure 3A:
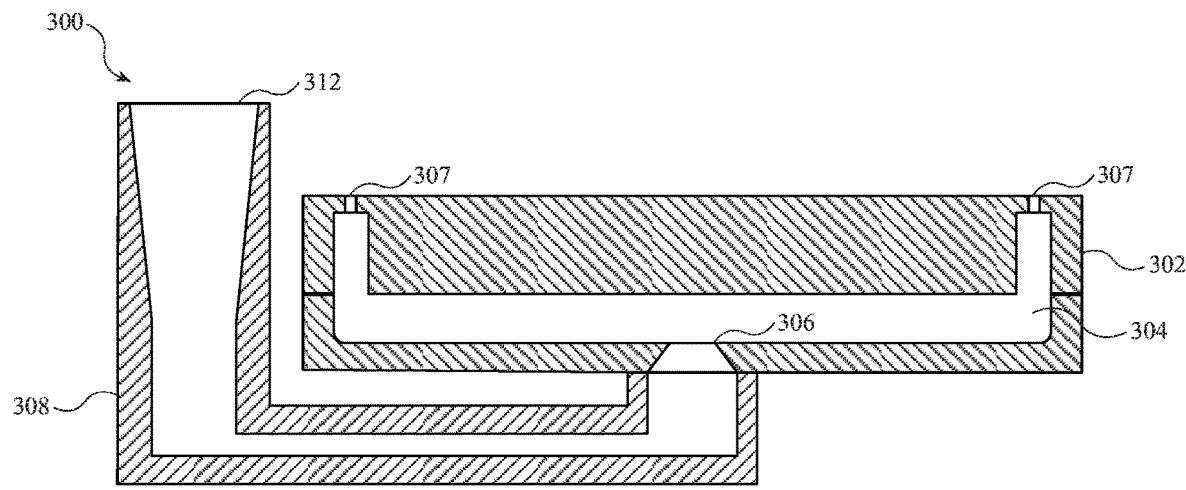
FIGS. 3A-3D depict cross-sectional views of a molding assembly.

FIG. 3A is a cross-sectional view of an exemplary molding apparatus 300 that may be used to form the housing 102. The molding apparatus includes a mold 302 having a mold cavity 304 and a gate 306. In some embodiments, the mold 302 includes vents 307 that allow air or other fluids to escape the mold cavity 304 when the mold cavity 304 is filled with material.

The mold 302 is coupled to a runner 308 that couples to the gate 306 of the mold 302. As shown in FIG. 3A, the mold 302 and the runner 308 are separable from one another. This may allow multiple molds to be fed from the runner 308. In some embodiments, the mold 302 and the runner 308 are coupled together or formed as a unitary component.

Figure 3B:
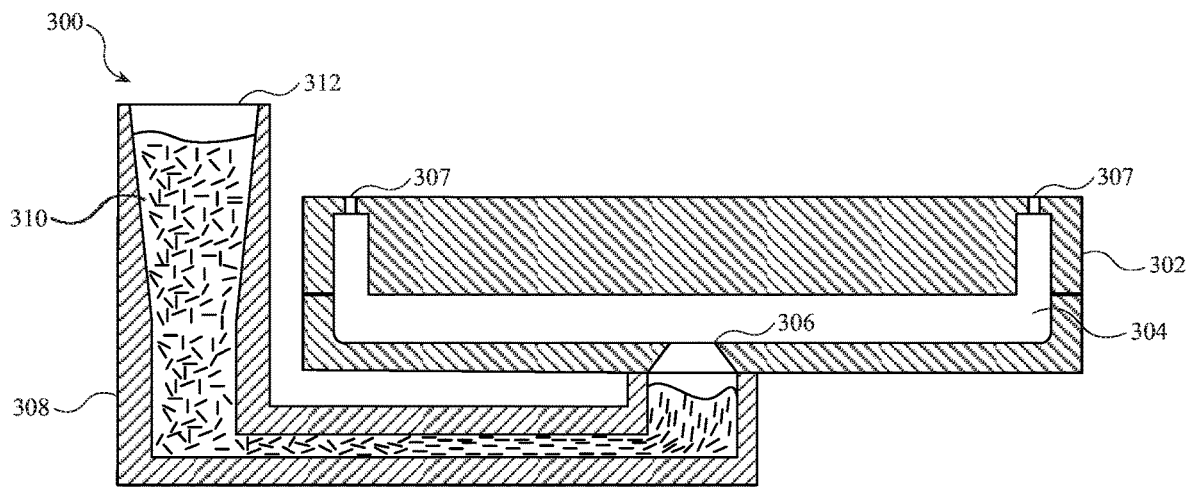

FIG. 3B depicts the molding apparatus 300 of FIG. 3A at a first time of a molding process. A slurry 310 has been introduced into a receptacle 312 of the runner, but has not yet passed through the gate 306 into the mold cavity 304. The slurry 310 includes reinforcing fibers mixed therein, as described above. In particular, the reinforcing fibers are substantially evenly distributed throughout the slurry 310. In the receptacle 312, the reinforcing fibers are not unidirectional or otherwise aligned in any coherent manner. As the slurry 310 flows through the runner 308 toward the gate 306, however, the reinforcing fibers begin to align with the direction of flow, an alignment that remains substantially coherent as the slurry 310 fills the mold cavity 304.

Figure 3C:
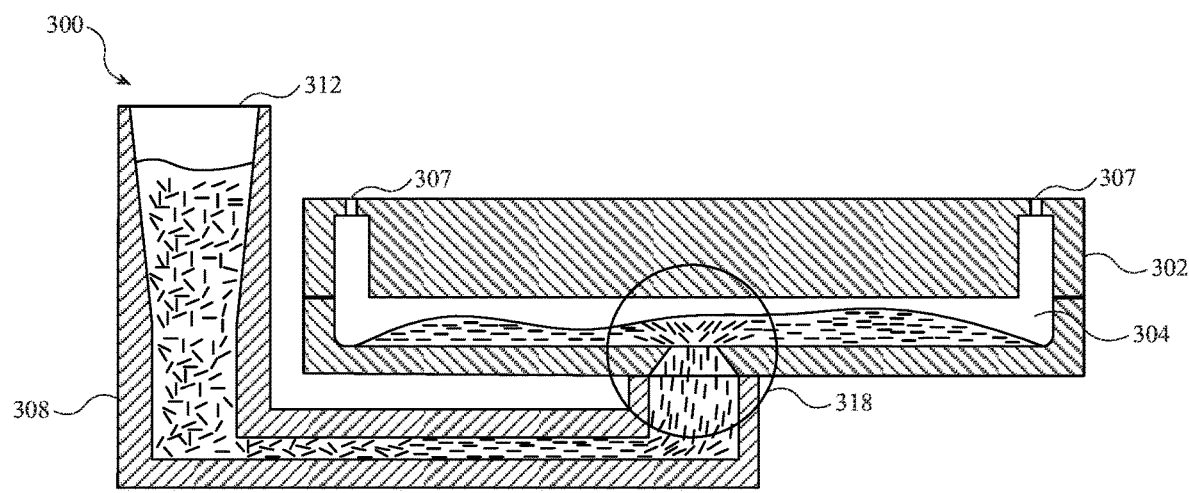

FIG. 3C depicts the molding apparatus 300 of FIG. 3A at a second time of the molding process. At this time, the slurry 310 partially fills the mold cavity 304. As noted above, the reinforcing fibers in the slurry 310 remain substantially aligned with the direction of the flow of the slurry 310 through the mold cavity 304.

Figure 3D:
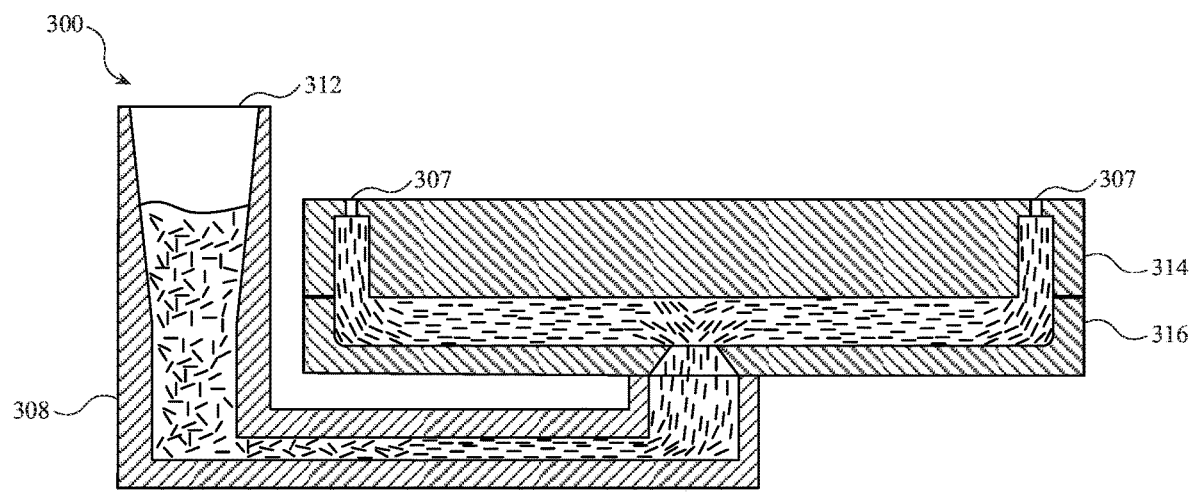

FIG. 3D depicts the molding apparatus 300 of FIG. 3A at a third time of the molding process, when the slurry 310 has completely filled the mold cavity 304. At this time, the mold 302 may be removed from the runner 308, and the slurry 310 may be at least partially cured within the mold, as described herein.

Once the slurry 310 is at least partially cured, the at least partially cured material can be removed from the mold cavity 304. For example, a first portion 314 of the mold 302 may be separated from a second portion 316 of the mold 302, allowing the at least partially cured material to be removed from the mold cavity 304.

Figure 4A:
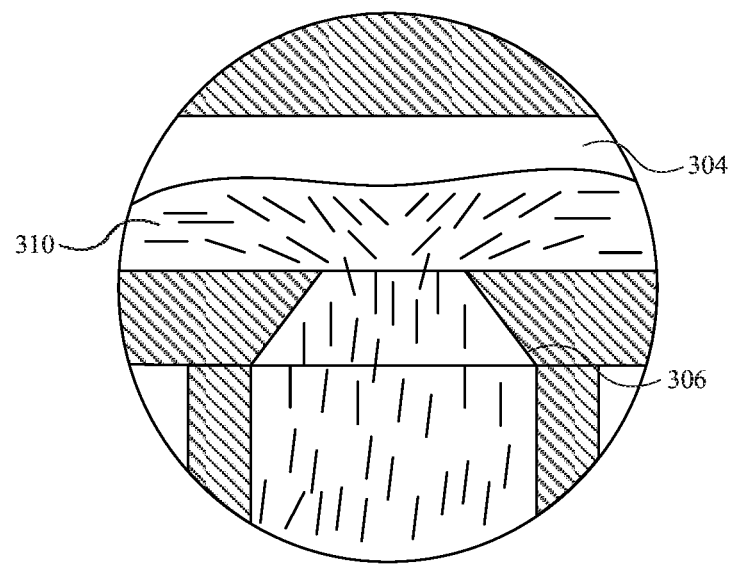
FIGS. 4A-4B depict cross-sectional views of a gate area of a molding assembly.

FIG. 4A is a cross-sectional view of an exemplary molding apparatus 300 of FIGS. 3A-3D, corresponding to area 318 in FIG. 3C. FIG. 4A illustrates the reinforcing fibers flowing through the gate 306 without becoming entangled with the gate, and thus without blocking the passage of other fibers or otherwise disrupting the flow of the slurry 310 through the gate 306. In some embodiments, the gate 306 and/or the reinforcing fibers in the slurry are selected so that the minimum opening size of the gate 306 is at least a predetermined factor larger than the average length of the reinforcing fibers, such as about 1.5-10.0 times larger than the average length of the reinforcing fibers, as discussed herein.

Figure 4B:
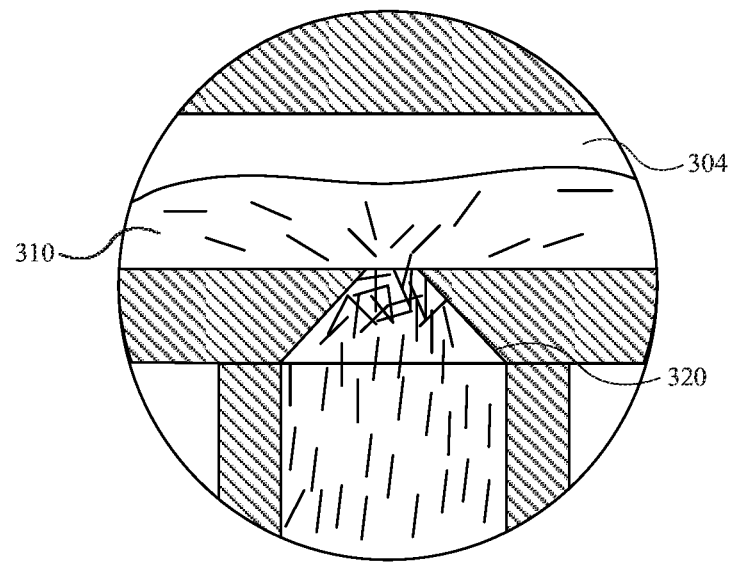

FIG. 4B is a cross-sectional view of the molding apparatus 300 of FIGS. 3A-3D, with an alternate gate 320 having a different minimum opening size as compared to the gate 306. In particular, in FIG. 4B, the gate 320 is not sufficiently large as compared to the size of the reinforcing fibers. Thus, as shown in FIG. 4B, some of the reinforcing fibers have become entangled at the entrance of the gate 320, and are interfering with the free-flow of the reinforcing fibers. Also, the blockage of the gate 320 by the reinforcing fibers may cause the pressure on the upstream side of the gate 320 to increase, which may ultimately lead to turbulent flow of the slurry through the gate. Such flow may be undesirable, as it may prevent the reinforcing fibers that do enter the mold cavity from aligning with the direction of the flow. Further, an increase in pressure may ultimately lead to the fibers in the blockage breaking prior to entering the mold cavity 304, resulting in a smaller average fiber length and thus a weaker component.

Figure 5:
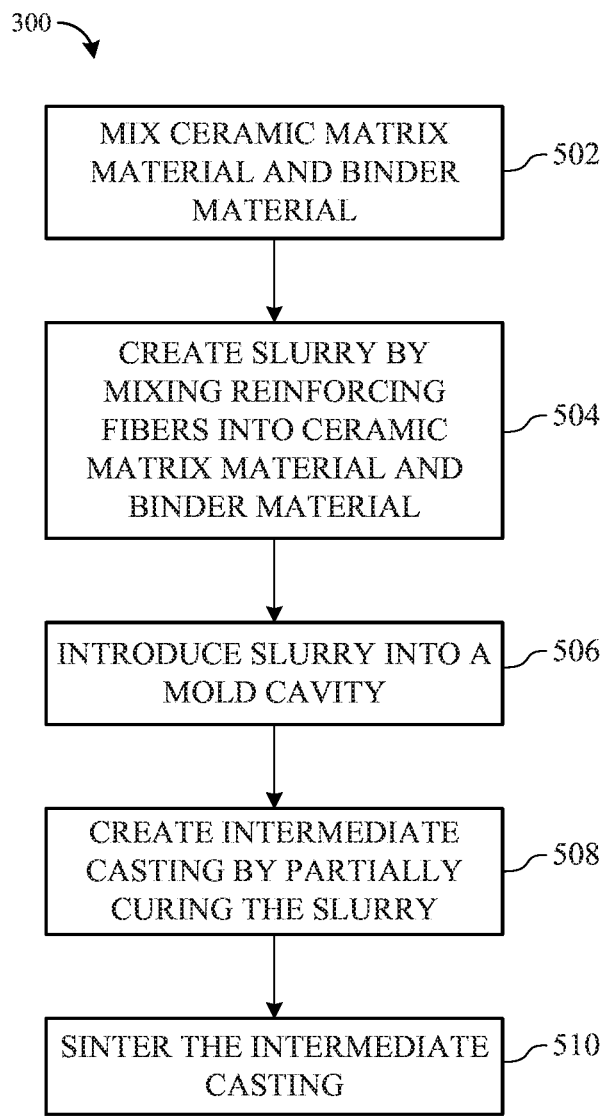
FIG. 5 depicts a method of manufacturing a component for an electronic device.

FIG. 5 depicts an exemplary method 500 of forming a fiber-reinforced ceramic component. In some embodiments, the component formed using the method 500 is used as a housing component for an electronic device (e.g., the housing 102 and the first and second housing portions 114, 116, described above), though the method may be used to form any appropriate component.

At block 502, a ceramic matrix material is combined with a binder material, and the ceramic matrix material and binder are mixed together to create an intermediate slurry. In some embodiments, the ceramic matrix material is porcelain, alumina, beryllia, ceria, zirconia, carbide, boride, nitride, silicide, or any other appropriate ceramic matrix material (or combination thereof). The ceramic matrix material may be in a powder form, or any other appropriate phase or physical configuration (e.g., flakes, granules, or the like).

In some embodiments, the binder material is any appropriate material (or combination of materials) that will bind the ceramic matrix material together during a casting or molding process to create an intermediate casting (sometimes referred to as a "green body"). Typically, the binder hardens and holds the ceramic matrix material in a particular shape or form, which can then be sintered to form the final component (as discussed below). In some embodiments, the binder material includes one or more polymer materials. In some embodiments, the binder material comprises multiple different components, which may be mixed prior to the binder being added to the ceramic matrix material, or added into the ceramic matrix material sequentially.

In some embodiments, the ceramic matrix material and the binder material are mixed together using an agitator that is at least partially submerged in the intermediate slurry. For example, the agitator may be a ball, propeller, turbine, paddle, or the like, that is at least partially submerged in (and hence physically contacts) the ceramic matrix material and the binder material to mix the materials. In some embodiments, other components (e.g., solvents, mold-release agents, dispersing agents, and the like) are mixed into to the intermediate slurry at block 502 in addition to the binder material and the ceramic matrix material.

At block 504, reinforcing fibers are added to and mixed with the intermediate slurry. The reinforcing fibers may be organic fibers, oxide fibers, and/or non-oxide fibers. For example, in some embodiments, the reinforcing fibers are carbon fibers, carbon nanotubes, alumina fibers, zirconia fibers, silicon carbide fibers, boron nitride fibers, elemental boron fibers, or the like (or any appropriate combination of the foregoing fibers or others not mentioned). The reinforcing fibers may take any appropriate form, including continuous filaments, fiber tows, woven textiles, chopped fibers, or milled fibers (or any appropriate combination of the foregoing forms of reinforcing fibers or others not mentioned). Moreover, multiple different kinds of reinforcing fibers may be added to the intermediate slurry. For example, a mixture of alumina and zirconia fibers (and/or any other reinforcing fibers) may be added to the intermediate slurry. As another example, a mixture of zirconia fibers having different diameters and/or length may be added.

The particular reinforcing fibers (and/or the physical properties of the reinforcing fibers) and ceramic matrix materials used to create the slurry may be selected using any appropriate criteria. For example, reinforcing fibers may be selected or treated to have a particular surface texture, which may affect how the reinforcing fibers mechanically engage with the ceramic matrix material. More particularly, a rougher surface texture on the reinforcing fibers may increase the strength of the bond between reinforcing fibers and the surrounding ceramic matrix material. As another example, the straightness of the reinforcing fibers may also affect how the reinforcing fibers mechanically engage with the ceramic matrix material—fibers having more curves or having curves with smaller radii may form stronger bonds with the surrounding ceramic matrix material. As yet another example, the density of the reinforcing fibers may affect how much the fibers shrink during sintering, and can be selected so as to optimize the amount that the component shrinks during sintering. More particularly, fibers that shrink substantially more or less than the surrounding ceramic matrix material may cause unwanted deformations during sintering, or may weaken the mechanical bonds between the ceramic matrix material and the fibers. On the other hand, it may be desirable to select fibers and ceramic matrix materials that shrink disproportionately to one another, which may help to increase or decrease the strength of the bond between the matrix material and the fibers (either of which may be desirable under certain circumstances).

In some embodiments, the dimensions of the reinforcing fibers depend on the type of reinforcing fibers selected. For example, in some embodiments, where carbon nanotubes are selected as the reinforcing fiber, the average diameter may be about 1-10 nanometers and the average length about 25-100 microns, whereas if zirconia fibers are selected, the average diameter may be about 5-15 microns and the average length may be about 100-200 microns. Moreover, the type of reinforcing fiber selected, as well as the dimensions of those reinforcing fibers, may be based on any appropriate factors or considerations, such as the strength of the fibers, the possible dimensions for a particular type of fiber, the coefficient of thermal expansion of the fibers, and so on. Where chopped or milled fibers are used, the average length of the reinforcing fibers is about 50-250 microns, or any other appropriate length. In some embodiments, the average diameter of the reinforcing fibers is about 5-20 microns in diameter, or any other appropriate diameter.

In some embodiments, a particular quantity of reinforcing fibers is added such that the intermediate slurry has a desired volume fraction of reinforcing fibers (e.g., such that the intermediate slurry is a certain percentage, by volume, of reinforcing fibers). In some embodiments, the volume fraction of reinforcing fibers in the intermediate slurry is about 2.5-25%, or any other appropriate volume fraction.

As discussed herein, ceramic materials may shrink or otherwise deform during the process of manufacturing a ceramic component. In some cases, the presence of reinforcing fibers may cause undesirable asymmetric or non-isometric deformations during processing, such that the final part does not satisfy target dimensional tolerances. Such deformations may result, at least in part, from the differences in how the reinforcing fibers and the ceramic matrix materials expand and contract in response to being heated and/or cooled. Undesirable deformations may be prevented or reduced to acceptable levels by selecting ceramic matrix materials and reinforcing fibers that have similar coefficients of thermal expansion. In particular, during the sintering process (described below), if the reinforcing fibers and the ceramic matrix material have different coefficients of thermal expansion, the differences in how much the ceramic material and the reinforcing fibers expand and/or contract will result in internal stresses within the component. These internal stresses may cause non-uniform or asymmetric deformation of the component. Thus, by selecting ceramic materials and reinforcing fibers that have similar coefficients of thermal expansion, the component may maintain its dimensional integrity through the sintering process. For example, in some embodiments, the ceramic matrix material is zirconia powder and the reinforcing fiber is zirconia fiber, each of which has substantially similar coefficients of thermal expansion.

As noted above, the reinforcing fibers are mixed with the intermediate slurry at block 504. In some embodiments, the reinforcing fibers are mixed with the intermediate slurry without using an agitator that contacts or is submerged in the slurry. In particular, a mixing process that uses an agitator may break or damage the reinforcing fibers, resulting in smaller or weaker fibers, and generally reducing the overall strength of the component that is ultimately produced from the slurry.

In some embodiments, mixing the reinforcing fibers with the intermediate slurry includes centrifugally mixing the reinforcing fibers and the intermediate slurry. Centrifugal mixing may not require an agitator or other implement that contacts the intermediate slurry, and thus mixes the intermediate slurry and the reinforcing fibers while reducing or eliminating the risk of damage to the reinforcing fibers. As a result of the centrifugal mixing, the reinforcing fibers may be substantially evenly distributed throughout the intermediate slurry. Once the intermediate slurry is mixed with the reinforcing fibers, the mixture may be referred to as a final slurry or simply as a slurry.

In some embodiments, centrifugal mixing includes introducing the intermediate slurry and the reinforcing fibers into a centrifugal mixer, such as a centrifuge (e.g., a planetary or asymmetric centrifuge), and spinning the components until the binder, ceramic matrix material, reinforcing fibers (and any other components of the intermediate slurry) are sufficiently mixed. As a result of the centrifugal mixing process, the reinforcing fibers may be substantially evenly distributed throughout the slurry. More particularly, the density of the reinforcing fibers at any one location in the slurry may be substantially the same as the density of the reinforcing fibers at any other location in the slurry. In some embodiments, the substantially even distribution of reinforcing fibers throughout the slurry results in substantially even distribution of reinforcing fibers throughout the final ceramic component (or at least increases the degree to which the reinforcing fibers are evenly distributed throughout the final ceramic component).

At blocks 502 and 504, a slurry is formed by first mixing ceramic matrix material and binder to form an intermediate slurry, and then mixing reinforcing fibers into the intermediate slurry. In an another embodiment, the ceramic matrix material and the fibers are mixed together prior to adding the binder, for example, using a double-cone or V-blender. The binder is then added to the mixed combination of ceramic matrix material and reinforcing fibers to form the slurry.

At block 506, the slurry (which includes at least the ceramic matrix material, the binder material, and the reinforcing fibers) is introduced into a mold cavity having a shape corresponding to the ceramic component. The ceramic component may be for any appropriate purpose, and, thus, may have any appropriate shape. In some embodiments, the ceramic component is a portion of a housing for an electronic device. Specifically, the ceramic component may be used as a portion of an outer shell for a watch (e.g., a smartwatch, a mechanical watch, an electrical watch, or an electromechanical watch), smartphone, tablet computer, a laptop computer, or any other appropriate device. In some embodiments, the ceramic component has a shape corresponding to the housing components depicted in FIGS. 2A-2B, though any other appropriate shape is possible.

In some embodiments, the mold includes a gate through which the slurry passes when the slurry is introduced into the mold cavity. While the opening of the gate may have varying sizes and shapes along the length of the gate, the gate will have a minimum opening size at some point. In some embodiments, the minimum opening size is larger than the average length of the reinforcing fibers. In particular, in some cases, the minimum opening size is at least a predetermined factor larger than the average length of the reinforcing fibers, such as about 1.5-10.0 times larger than the average length of the reinforcing fibers (or any other appropriate factor). In some embodiments, a minimum opening size of 1.5 times larger than the average length of the reinforcing fibers represents a smallest minimum opening size that can be used without trapping the fibers in the gate and thus disturbing the flow of the slurry into the mold cavity. In some embodiments, a minimum opening size of 10 times larger than the average length of the reinforcing fibers represents the largest size that is practical in view of the size of the reinforcing fibers. For example, in some embodiments, it is desirable to reduce or minimize the opening size to reduce or minimize the size of a sprue that is left on the component near the gate after molding the component. In some embodiments, a minimum opening size that is 10 times larger than the length of the reinforcing fibers is large enough to ensure free-flow of the fiber-containing slurry through the gate, and is not so large that the sprue becomes difficult to remove. In some embodiments, the minimum opening size is about 500-1500 microns, or any other appropriate dimension.

The gate, as well as the portion of the gate having the minimum opening size, may have any appropriate cross-sectional shape, including square, oval, circular, or the like. In some embodiments, the portion of the gate corresponding to the minimum opening size has a substantially circular cross-section, and the minimum opening size corresponds to a diameter of the gate at that location.

A gate with a minimum opening size that is larger than the average length of the reinforcing fibers may help reduce or eliminate blockages caused by the fibers becoming tangled and trapped in the gate, and may also reduce or eliminate breakage and/or damage to the fibers caused by forcing the fibers through too small of an opening. Additionally, the free flow of reinforcing fibers that is afforded by a sufficiently large opening may help to maintain the substantially even distribution of fibers throughout the slurry that was produced as a result of the mixing process.

The shape and/or the minimum opening size of the gate may be selected in any appropriate manner and to achieve any desired results. For example, the minimum opening size may be selected so as to achieve a particular shear and/or shear rate applied to the slurry while the slurry is passing through the gate. In some embodiments, as described herein, a lower relative shear value is desired, as higher shear may result in the fibers, the ceramic matrix material, the binder material, and other components of the slurry, becoming separated. Accordingly, the gate size and/or geometry may be selected to achieve a low shear and/or shear rate when introducing the slurry into the mold cavity.

In some embodiments, the slurry is introduced into the mold cavity without application of additional pressure to the slurry. For example, in some embodiments, a gravity casting process is used, whereby the slurry is allowed to flow into the mold cavity as a result of the force of gravity, and without pressurizing the slurry. In other embodiments, the slurry is pressurized (e.g., with an injection molding screw, a plunger, or any other appropriate device or process) so as to force the slurry into the mold cavity. Applying pressure may increase the speed at which the slurry is introduced into the mold cavity. Moreover, depending on the properties of the slurry (e.g., the viscosity, the volume fraction of reinforcing fibers, and the like) and/or the properties of the mold (e.g., the size and shape of the mold cavity, the minimum opening size of the gate, and the like), the addition of pressure may be necessary (or at least helpful) to cause the slurry to flow into the mold cavity.

In some embodiments, the reinforcing fibers in the slurry are substantially unidirectional. In particular, when the slurry is introduced into the mold cavity, the fibers may become substantially aligned with the direction of the flow of the slurry, such that the length dimension of a particular fiber is substantially parallel to the direction of flow of the slurry in the immediate vicinity of the particular fiber. Moreover, the mold geometry and gate location may be configured such that the fibers are aligned in a desired manner with respect to the geometry of the component being manufactured. For example, as described about with respect to FIGS. 2C-2D, the fibers may be aligned radially outward from an area near the gate, or substantially parallel with a major axis of the component.

In some embodiments, the reinforcing fibers in the slurry in the mold are not aligned as desired after the slurry is introduced into the mold cavity. In such cases, the mold may be manipulated in order to cause the reinforcing fibers to align in a particular orientation (or become substantially randomly oriented). For example, the mold may be vibrated, rotated, or otherwise manipulated to achieve a desired fiber orientation.

When the slurry is cured and sintered (described below), the reinforcing fibers may maintain their alignment within the ceramic matrix material, producing a component that may exhibit superior properties as compared to one with non-unidirectional fibers. Notably, all of the reinforcing fibers throughout a component need not be parallel to one another; rather, fibers may be substantially parallel to other fibers in the same localized area, though they are not parallel with fibers in other areas of the component. An illustration of unidirectional reinforcing fibers in a ceramic component is shown in FIG. 2A.

In blocks 502-506, ceramic fibers are mixed with a ceramic matrix material to create a slurry, and the slurry is introduced into a mold cavity. In some embodiments, however, reinforcing fibers and ceramic matrix material are combined and/or introduced into a mold in other ways. In some embodiments, reinforcing fibers (e.g., continuous filaments, fiber tows, and woven textiles) are insert molded with the ceramic matrix material by introducing the reinforcing fibers into a mold and thereafter introducing ceramic matrix material into the mold. For example, a textile material formed from reinforcing fibers may be introduced into a mold cavity. In some embodiments, the textile material is introduced into the mold such that the reinforcing fibers are oriented substantially unidirectionally with respect to the mold cavity and/or the geometry of the final component, and such that they are substantially evenly distributed throughout the mold cavity and/or the final component. The mold is then closed, and a ceramic matrix material (which may be mixed with binders or other materials as well) is introduced into the mold cavity. In some embodiments, pressure is applied to the ceramic matrix material to force the material into the mold cavity and onto or around the textile material. Alternatively, the ceramic matrix material may be introduced into the mold cavity without applying pressure, such as via gravity casting. The ceramic matrix material flows onto and/or around the textile material in the mold cavity (including filling interstitial voids between individual reinforcing fibers of the textile material) to form a fiber-reinforced material. The same or a similar process may be used for insert molding with non-textile reinforcing fibers, such as continuous filaments or fiber tows.

In some embodiments, reinforcing fibers (e.g., continuous filaments, fiber tows, woven textiles, chopped fibers, or milled fibers) and ceramic matrix material are laid-up in an open mold, and thereafter cured and sintered to form a component. For example, a reinforcing fiber material, such as one or more layers of woven textile, chopped fiber, fiber tows, or the like, may be laid on one or more surfaces a mold cavity of an open mold. It will be understood that a mold cavity is any portion of an open mold, whether or not the mold cavity forms a recess or a protrusion.

In some embodiments, the reinforcing fibers are laid in the mold cavity such that they are oriented substantially unidirectionally with respect to the mold cavity and/or the geometry of the final component, and such that they are substantially evenly distributed throughout the mold cavity and/or the final component. A ceramic matrix material may then be applied to the reinforcing fiber. In some embodiments, additional layers of reinforcing fibers and ceramic matrix material are applied to the mold until a desired composition is achieved. The mold may then be closed and the ceramic matrix material cured. In some embodiments, curing the lay-up includes applying pressure and/or heat to the mold.

Laying up the reinforcing fibers and the ceramic matrix material may include layering reinforcing fibers and ceramic matrix material in a mold to achieve a desired non-uniform composition of reinforcing fibers and matrix material. For example, reinforcing fibers may be included in some portions of a mold and not in other portions, resulting in a component having only partial fiber-reinforcement. As another example, different portions of a mold may be laid up with different relative amounts of reinforcing fiber (e.g., one area may have a 20% volume fraction of reinforcing fiber, while another area has a 5% volume fraction). As yet another example, reinforcing fibers of different forms, lengths, properties, or composition may be laid up in different portions of the mold (e.g., woven textile reinforcing fiber may be used in one area, and chopped reinforcing fiber may be used in another area). Such techniques allow reinforcing fiber to be concentrated in areas where higher stresses are present, or concentrated away from cosmetic surfaces of the component (e.g., external surfaces of an electronic device housing) to prevent visible reinforcing fibers on those surfaces.

At block 508, the slurry (or a lay-up or insert mold comprising reinforcing fibers and ceramic matrix material) is least partially cured within the mold to form an intermediate casting. For example, the mold may be heated to cause the slurry to at least partially cure in the shape of the mold cavity, and thus harden to a point where the cured material can be removed from the mold. In some embodiments, the slurry may cure without application of any heat. For example, in some embodiments, prior to introducing the slurry into the mold cavity (e.g., at block 502 or 504), a hardening agent is added to the slurry. The hardening agent may be a thermosetting resin (or any other appropriate material) that cures and hardens without the application of external heat. In such cases, the slurry may simply be allowed to remain in the mold until it is sufficiently cured to be removed from the mold cavity.

Once the slurry is at least partially cured, it is removed from the mold cavity. The at least partially cured slurry may be referred to as an intermediate casting or a "green body." An intermediate casting or green body is an object that has the shape and/or proportions of the final component, but in which the ceramic matrix is not yet bonded together to form a unitary ceramic material (which occurs as a result of sintering, described below). The intermediate casting may have a shape that corresponds to the final ceramic component, but may have different overall dimensions. Specifically, an intermediate casting may shrink during the sintering process. Thus, in order to achieve a component with particular dimensions, it may be necessary to produce an intermediate casting that is larger than the final component, but that has a shape that corresponds to the final component. In some cases, an intermediate casting shrinks isometrically when sintered. Accordingly, the intermediate casting may have a shape that is larger than the final component, but shares the same geometric proportions as the final component. In other cases, the intermediate casting shrinks non-isometrically when sintered. In such cases, the intermediate casting may have different geometric proportions than the final component.

At block 510, the intermediate casting is sintered to produce the ceramic component from the intermediate casting. In some embodiments, sintering includes heating, and optionally applying pressure to, the intermediate casting so as to burn off some or all of the binder material, and to cause the ceramic matrix material to bond together to form a unitary ceramic structure. In some embodiments, the binder material is burned off during the sintering process, whereas in other embodiments, the binder material is burned off prior to sintering as part of a separate binder-removal process.

In some embodiments, sintering includes heating the intermediate casting to a temperature that is below the liquefaction temperature of the ceramic matrix material, but hot enough that the ceramic matrix material bonds together and thus forms a unitary ceramic structure. In some embodiments, the temperature to which the intermediate casting is heated during sintering may be selected to be lower than a temperature at which an undesirable physical or chemical change occurs to a component of the slurry. For example, the sintering temperature may be selected so as to avoid melting of or damage to the reinforcing fibers.

Where burning off the binder material and sintering the intermediate casting are combined into one process, the process may include first heating the intermediate casting to a first temperature that is sufficient to burn off the binder material, but that is not sufficient to cause substantial bonding of the ceramic matrix material. Once the binder material is sufficiently burned off (e.g., after the intermediate casting has been at the first temperature for a desired duration), the intermediate casting is then heated to a second temperature that is sufficient to cause the ceramic matrix material to bond. The intermediate casting is then maintained at the second temperature for a sufficient duration to complete the sintering process. The particular temperatures and durations used in the foregoing processes may depend on factors including, but not limited to, the size and shape of the part, the type of binder material used, and the particular ceramic matrix material and reinforcing fiber used.

In some embodiments, as noted above, sintering an intermediate casting may cause the casting to change shape and/or dimensions (e.g., shrink) in undesirable ways. For example, if the intermediate casting is not subjected to heating on all of its surfaces at substantially the same time, at substantially the same temperature, or for the same duration, the intermediate casting may curl or deform such that the desired geometric proportions of the final component are not achieved. Thus, in some embodiments, sintering the intermediate casting includes exposing substantially all of the surfaces of the intermediate casting to a sintering environment, such as a sintering furnace, kiln, flame, hot air stream, or the like.

More specifically, sintering the intermediate casting may include placing the intermediate casting on a mounting structure inside of a sintering furnace, such that substantially all of the surfaces of the intermediate casting are exposed to the air (or other environment) of the sintering furnace. In some embodiments, the mounting structure contacts the intermediate casting over a small surface area relative to the size of the intermediate casting. For example, the mounting structure may include 1, 2, or 3 (or more) pins that extend away from a surface of the sintering furnace, and the intermediate casting may be placed on the pins during the sintering process such that the intermediate casting is elevated away from the surface of the sintering furnace. As another example, the mounting structure may include a mesh material or screen that supports at least a portion of a surface of the intermediate casting to elevate the intermediate casting from the surface of the sintering furnace. Once the intermediate casting is placed on the mounting structure inside the sintering furnace, the intermediate casting is sintered by heating the intermediate casting, as described above.

As noted above, sintering includes heating the intermediate casting. Depending on the particular ceramic matrix material and reinforcing fibers used, the heat required to sinter the ceramic matrix material may be higher than the heat that certain reinforcing fibers can tolerate. For example, a ceramic matrix material of silicon carbide may require heating to a temperature that would cause carbon reinforcing fibers to decompose or burn (or otherwise change their physical properties). Thus, if an intermediate casting of silicon carbide reinforced with carbon fibers were sintered at the appropriate temperature for silicon carbide, the reinforcing fibers may be substantially weakened, or may disintegrate entirely. Accordingly, in some embodiments, reinforcing fibers that are encased in another material are used. For example, carbon fibers encased in a silicon carbide sheath may be used in place of bare carbon fibers. During sintering, the silicon carbide sheath may insulate the carbon fibers from the heat of the surrounding ceramic matrix material. Thus, the ceramic matrix material may be heated to a temperature that is above the temperature at which carbon fibers would decompose, while the carbon fibers encased in the silicon carbide sheaths are prevented from reaching that temperature, and thus retain their structural integrity.

While the method 500 is presented in a particular order, the method is not limited to this particular order of operations; rather, the operations described may be performed in any order. Moreover, some operations that are described above may be omitted entirely, and other operations that are not described may be included.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

What is claimed is:

1. A ceramic housing component for an electronic device, comprising:
   a unitary sintered ceramic matrix material formed from a slurry deposited into a mold cavity;
   reinforcing fibers distributed substantially evenly throughout the ceramic matrix material and aligned in directions of flow of the slurry when the slurry is introduced into the mold cavity, the reinforcing fibers being oriented radially outwardly from a particular area within a first portion of the ceramic housing component and unidirectionally within a second portion of the ceramic housing component, a direction of the reinforcing fibers of the second portion being different from directions of the reinforcing fibers of the first portion;
   wherein the ceramic housing component is formed by sintering a slurry comprising the ceramic matrix material and the reinforcing fibers to remove a binder from the ceramic matrix material.

2. The ceramic housing component of claim 1, wherein the ceramic matrix material is selected from the group consisting of porcelain, alumina, beryllia, ceria, zirconia, carbide, boride, nitride, and silicide.

3. The ceramic housing component of claim 1, wherein the reinforcing fibers have an average length of about 150 microns.

4. The ceramic housing component of claim 1, wherein the ceramic matrix material is zirconia powder.

5. The ceramic housing component of claim 1, wherein the reinforcing fibers within the second portion are aligned substantially parallel with a major axis of the ceramic housing component.

6. A housing component for an electronic device, comprising:
   a unitary structure comprising a ceramic matrix formed from a slurry including a ceramic matrix material and reinforcing fibers, the unitary structure defining:
   a back portion having the reinforcing fibers oriented substantially radially outwardly from a particular area and aligned in directions of flow of the slurry when the slurry is introduced into a mold cavity; and
   side portions extending from the back portion and having the reinforcing fibers oriented substantially unidirectionally in a direction aligned in a direction of the flow of the slurry when the slurry is introduced into the mold cavity, the direction different from directions of the reinforcing fibers of the back portion;
   wherein the unitary structure is formed by sintering the slurry to remove a binder therefrom.

7. The housing component of claim 6, wherein the direction is perpendicular to the reinforcing fibers of the back portion.

8. The housing component of claim 6, wherein the reinforcing fibers are chopped fibers.

9. The housing component of claim 8, wherein the reinforcing fibers have a length from about 50 microns to about 250 microns.

10. The housing component of claim 6, wherein the reinforcing fibers are carbon fibers encased in silicon carbide sheaths.

11. A ceramic housing component for an electronic device, comprising:
   a unitary structure comprising a sintered ceramic matrix material and reinforcing fibers distributed substantially evenly throughout the sintered ceramic matrix material, the unitary structure defining:
   a back portion having the reinforcing fibers oriented radially outwardly from a particular area within the back portion; and
   a side portion extending from the back portion and having the reinforcing fibers oriented randomly.

12. The ceramic housing component of claim 11, wherein the ceramic matrix material is selected from the group consisting of porcelain, alumina, beryllia, ceria, zirconia, carbide, boride, nitride, and silicide.

13. The ceramic housing component of claim 11, wherein the reinforcing fibers have an average length of about 150 microns.

14. The ceramic housing component of claim 11, wherein the ceramic matrix material is zirconia powder.

15. The ceramic housing component of claim 11, wherein the reinforcing fibers within the back portion are first reinforcing fibers and the reinforcing fibers within the side portion are second reinforcing fibers; and
   the first reinforcing fibers comprise a first material and the second reinforcing fibers comprise a second material that is different from the first material.

16. The ceramic housing component of claim 15, wherein the first reinforcing fibers or the second reinforcing fibers comprise at least one of zirconia or alumina.

\* \* \* \* \*